United States Patent [19]

Moore

[11] 4,145,207

[45] Mar. 20, 1979

[54] PREPARATION OF IMPROVED FOLIAR FERTILIZER

[76] Inventor: William P. Moore, P.O. Box 943, Hopewell, Va. 23860

[21] Appl. No.: 751,174

[22] Filed: Jan. 19, 1977

[51] Int. Cl.$^2$ .............................................. C05C 9/02
[52] U.S. Cl. ......................................... 71/29; 71/30; 71/64 C; 260/555 R
[58] Field of Search ................. 71/1, 27, 28, 29, 64 C, 71/30; 260/29.4 R, 555 R

[56] References Cited

U.S. PATENT DOCUMENTS

| | | | |
|---|---|---|---|
| T951,006 | 10/1976 | Getsinger | 71/28 |
| 3,459,528 | 8/1969 | Wiesboeck | 71/28 |
| 3,712,879 | 1/1973 | Strickrodt et al. | 71/28 X |
| 4,033,745 | 7/1977 | Moore | 71/28 |

FOREIGN PATENT DOCUMENTS

| | | | |
|---|---|---|---|
| 737468 | 9/1955 | United Kingdom | 71/28 |
| 1387839 | 3/1975 | United Kingdom | 71/64 C |

*Primary Examiner*—Ferris H. Lander

[57] ABSTRACT

Method for preparation of a stable, non-burning, liquid foliar fertilizer for increasing yields of field crops, from substantially urea nitrogen, which comprises: reacton of completely dissolved urea and formaldehyde for 5–10 minutes at temperatures of 50° C., or less, in an acid mixture rapidly brought to pH less than 3.0, increasing reaction temperature to 70° C. by use of the exothermic heat of urea-formaldehyde polymerization and continuing the reaction for 30 minutes while increasing pH stepwise to more than 4.0 by addition of ammonia; reacting 0.1 to 5.0% aliphatic alcohols with this mixture; neutralizing to pH 6.1 to 6.5 by addition of aqueous base solution; adding additional fertilizer ingredients desired, including potash and phosphate, while cooling to ambient storage temperature; and blending with gelled attapulgite clay so that final fertilizer contains 0.5 to 2% (wt) clay.

2 Claims, No Drawings

PREPARATION OF IMPROVED FOLIAR FERTILIZER

BACKGROUND OF THE INVENTION

This invention relates to liquid foliar fertilizers for field crops, which produce significant plant responses without the hazard of burn damage to the plant, and more particularly to an improved stepwise method for its preparation by acid-catalyzed polymerization of urea and formaldehyde and reaction with minor amounts of aliphatic alcohols under conditions of increasing reaction temperature and decreasing acidity during a defined reaction time, terminated by neutralization with aqueous base.

Recent publications have shown that foliar fertilization of field crops with liquid fertilizers, when carefully applied, produce a positive crop response and an increase in yields. Dr. John Hanway, at Iowa State University, has reported that soybean yields were increased significantly by multiple applications of relatively small amounts of clear liquid fertilizers to the foliage. These foliar fertilizers contained urea, potassium phosphate and polyphosphate, and potassium sulfate. Although it has been reported, in some cases, that substantial rates of application of clear liquid fertilizers have been used for foliar feeding of soybean plants with minor leaf burning. Results have been erratic depending upon such factors as atmospheric moisture and time of application. Without special precautions, information published in the art indicates that foliar feeding of 6 pounds of nitrogen, or more, in the form of clear liquid fertilizer, per acre causes appreciable leaf burn and damage to the crop.

Urea-formaldehyde polymers have been reported in the prior art to have quite low solubility so that the product does not form concentrated nitrogen solutions that have a tendency to burn the foliage of vegetation. All urea-formaldehyde products heretofore commercialized have been in the solid state. Solid particles adher to foliage very poorly and if they are caused to adher by the use of a sticking agent, the particles release their nutrients in too small a spot on the foliage for effective use by the plant.

Suspensions of urea-formaldehyde in liquid fertilizers containing appreciable amounts of water insoluble nitrogen and a method for their preparation was disclosed in U.S. Pat. No. 3,096,168. Although fertilizer prepared by the method of U.S. Pat. No. 3,096,168 gives prolonged release of nitrogen in the soil, direct application to the foliage of crops is not efficacious, but causes serious foliage burn and reduction in crop yield. Similarly, foliage burn and yield reduction is caused by direct application to crops with the liquid suspensions containing ureaformaldehyde polymers having high activity indices, prepared by the method disclosed in U.S. Pat. No. 3,677,736. The products prepared by these teachings are storable for only a few days before separation and settling of the insoluble constituents make it impossible to handle in normal tanks, pipes, and pumps. The chain lengths of the ureaformaldehyde polymers continue to grow in these products during prolonged storage for commercially necessary times, such as 90 days, as indicated by increased viscosity and eventual complete solidification.

Copending U.S. application Ser. No. 692,433 filed June 3, 1976, discloses a complete, non-burning, liquid turf fertilizer suspension composition, comprising, highly polymerized urea-formaldehyde, water soluble sugars, aliphatic alcohols, and water. This product is stable and storage for commercially useful periods of time and contains 60 to 80% of the nitrogen in water insoluble form with an activity index of 25 to 35%. Accurate addition of aliphatic alcohol and water soluble sugars are required in this composition. The procedure required to produce the very accurate control of the urea-formaldehyde polymerization is tedious, and wasteful of energy because it requires heating the reaction mixture under basic conditions, followed by cooling to decrease temperature for polymerization under mildly acid conditions with constant cooling. Addition of sugars is also required to give the required stability for commercial utility.

It is a primary object of this invention to provide an improved method for the preparation of storable, liquid, urea-formaldehyde polymer foliar fertilizers which may be used to increase field crop outputs without the hazard of foliage damage.

It is another object of this invention to provide a simple method for the preparation of stable urea-formaldehyde polymer foliar fertilizers which eliminates the requirement of carbohydrates or sugars.

It is another object of this invention to provide a method for the preparation of a liquid suspension of urea-formaldehyde-based foliar fertilizer which significantly reduces process energy requirements.

It is another object of this invention to provide a method for safe and efficacious feeding of nutrients through the foliage of field crops to increase agricultural product yields.

Other objects and advantages of the present invention will be evident from the following description of the invention.

SUMMARY OF THE INVENTION

It has now been discovered that these and other objects are accomplished by a stepwise preparation method comprising: (1) dissolving urea and formaldehyde in aqueous alkali solution at a temperature lower than 50° C. (12) adding mineral acid to rapidly reduce pH lower than 3, (3) maintaining temperature and pH for 5-10 minutes, (4) allowing the exothermic heat of the urea-formaldehyde reaction to gradually increase temperture of the reaction mixture to 70° C. while increasing pH of the mixture at the rate of about 0.1 pH unit per 2° C. temperature rise by reaction with ammonia, (5) cooling and adding aliphatic alcohol, (6) neutralizing the reaction mixture by addition of aqueous ammonia, (7) addition of other primary-, secondary-, and micro-nutrients, (8) blending with matrix-forming suspending agents amounting to 0.5 to 2.0% by weight of the total liquid foliar fertilizer.

The improved perparation method initiates the formation of a large number of urea-formaldehyde polymer moleculars, grows them evenly, stops their growth when all the urea is reacted, treats them chemically with aliphatic alcohols to prevent disproportionation to higher and lower molecular weight polymers and formation of some free urea, controls intensity of the urea-formaldehyde reaction, and thereby the development of polymer growth and stability of the liquid fertilizer, by accurate control of reaction pH as it relates to reaction temperature, while saving process energy by utilization of the exothermic heat from the urea-formaldehyde reaction, grows urea-formaldehyde polymers high enough in molecular weight to physically associate with mattrix-forming suspending agents and form a highly stable liquid suspension.

Solid urea, aqueous urea solution, aqueous formaldehyde or urea-formaldehyde concentrates of various types, and combinations of these ingredients may be used in this invention. For reasons of economics, ease of handling, and absence of biuret impurity, aqueous urea solution is the preferred source of urea. Urea-formaldehyde concentrate containing about 60% formaldehyde and 25% urea is the preferred source of formaldehyde for reasons of handling convenience.

I have found that urea solution and urea formaldehyde concentrate may be put completely in solution at temperatures lower than 50° C. and that the concentrations which may be obtained are sufficient to produce a final fertilizer containing at least 12% nitrogen, or more. It is necessary that the urea and formaldehyde be completely in solution before the polymerization reaction is begun, to prevent the formation of urea-formaldehyde polymers with widely varying chain lengths, causing poor storage stability. It is necessary to add a small amount of aqueous alkali to the initial reaction mixture to assure complete solubility of the urea and formaldehyde at temperatures below 50° C.

A rapid increase in the acidity of the reaction mixture, as indicated by decrease in pH below 3, is necessary to initiate the maximum number of urea-formaldehyde polymer chains. Any mineral acid of sufficient ionic strength may be used. Ortho- or poly-phosphoric acid produces a desirable plant food and are therefore the preferred acids. It is necessary to hold the temperatures at 50° C. or lower for a short period of time to allow the formation of these seed polymers with minimum chain growth. Optimum time at 50° C. is 5–10 minutes. The growth of the urea-formaldehyde polymers is then allowed to proceed by allowing the exothermic heat of reaction to increase reaction temperature to 70° C.

It has been found that the storage stability of the liquid foliar fertilizer can be maximized and free urea formation prevented by maintaining a close control of the pH-temperature relationship in the reaction mixture. To maintain adequate control, pH of reaction mixture is increased 0.1 unit for each 2° C. temperature rise in the reaction mixture. This pH control is normally exercised by addition of small amounts of aqueous ammonia. Loss of carbon dioxide, and other acidic materials, from the reaction mixture as reaction temperature increases also increases pH.

When reaction temperature reaches 70° C., the pH of the reaction mixture must be higher than 4 to maximize nitrogen recovery, safety for use on foliage of field crops, and storage stability.

Reaction of the urea-formaldehyde polymers with small amounts of aliphatic alcohols under acid conditions at a pH slightly above 4 and at temperatures between 70° C. and 40° C., is best carried out as the polymerized urea-formaldehyde solution is being cooled. The reaction with water soluble aliphatic alcohols reduces the tendency for the urea-formaldehyde polymers to grow and disproportionate during prolonged storage periods. The aliphatic alcohols should be low in molecular weight to allow them to vaporize from the foliage without causing phytotoxicity. Methyl alcohol is preferred because of its effectiveness at low concentrations and low cost. Aliphatic alcohols containing as many as four carbons in their molecular skeletal chain have been found to perform satisfactorily in the method of this invention.

Neutralization by addition of ammonia solution to a very close pH range is necessary after the addition of the alcohol. For satisfactory performance of my method and the product produced therefrom, pH must be brought to 6.0 to 7.0, and preferably to 6.1 to 6.5.

After the neutralization has been completed, other nutrients desired in the foliar fertilizer are added to the mixture. The types and amounts of these nutrients added may be varied somewhat. The use of liquid phosphate in the polyphosphate form is necessary to the storage stability of the liquid fertilizer and to increase availability of some metal micronutrients to the plants fertilizer. Potassium may be added as commercial soluble grade potassium chloride, potassium sulfate, or preferably, as neutral potassium polyphosphate solution.

Minor- and micronutrients are best added in the neutral chelated forms, such as the zinc ethylenediaminetetracetic acid chelate. Acid salts, such as ferric chloride, are not satisfactory, causing disproportionating polymerization, and poor storage properties.

The final step in the method for preparation of improved foliar fertilizer is important. It is necessary that an aqueous, gelled, mattrix-forming suspending agent be added to the mixture. Attapulgite clay amounting to 0.5 to 2.0% of the final foliar fertilizer is the preferred suspending agent. It is convenient to add the clay as a pre-gelled aqueous suspension containing 10–13% clay, but it may be gelled in the reactor by circulating through a high speed centrifugal pump or other appropriate equipment. Other suspending agents including gums, and cellulose products such as carboxymethyl cellulose, may be used where there is a mattrix capable of physically forming a lattice type structure in the liquid with the linear urea-formaldehyde polymer molecules. Cost factors favor selection of the attapulgite clay. Other clays, not having the mattrix forming character of attapulgite clays, are not satisfactory.

Although my method for the preparation of improved foliar fertilizer may use a variety of nitrogen sources containing urea as a starting material, it is necessary that the urea nitrogen amounts to at least 75% of the total nitrogen used in the preparation. Where non-urea nitrogen, including ammonia, biuret, and other compounds, amount to more than 25% of the nitrogen, the amount of burn on the foliage of plants treated with the fertilizer is increased significantly.

Foliar fertilizers may be produced by the method of this invention containing as much as: 20% nitrogen, 25% phosphorous as $P_2O_5$, or 25% potassium as $K_2O$. Maximum content of primary nutrients is 32%. Method performs best with total primary nutrient concentration of 18 to 25%. The most effective grades of foliar fertilizer produced by the method of this invention contain 12% N-4% $P_2O_5$-3% $K_2O$-0.5% S and 10% N-5% $P_2O_5$-6% $K_2O$-1% S, in addition to small amounts of micronutrients.

Foliage of field crops comprising soybeans, peanuts, rice, corn, sorghum, small grain, grasses, and vegetables may be treated effectively and without the hazard of foliage burn with foliar fertilizers prepared by the method of this invention. If desired from the standpoints of increased coverage or delivery of pesticides, the foliar fertilizers may also be blended with other non-burning materials, or diluted with water and applied. However, once the fertilizer has been blended or diluted, its storage stability is greatly reduced.

Direct application of fertilizer of this method may be efficaciously applied to the foliage of field crops at rates as high as 250 pounds per acre without appreciable leaf burn. It is necessary for best performance that the spray be finely atomized to produce coverage of the foliage area.

DESCRIPTION OF THE PREFERRED EMBODIMENTS

The following examples illustrate the criticality of method for the preparation of chemically stable, and commercially storable, liquid suspension fertilizers containing nitrogen primarily in the water insoluble form, in terms of product safety stability and efficacy for foliar fertilization and production process energy savings. All parts and percentages are by weight unless otherwise specified.

EXAMPLE 1

This example demonstrates a practical and effective preparation method employing a small amount of ammonium nitrogen.

To a 8' diameter, 1200 gallon, jacketed stainless steel reactor, equipped with high shear centrifugal circulating pump and 18" diameter turbine agitator with 6 flat blades, was added 3210 pounds of urea liquor containing 40% urea and 60% water and 864 pounds of urea-formaldehyde concentrate, containing 25% urea, 60% formaldehyde and 15% water. Agitation was started in the reactor and 15 pounds of commercial caustic soda, containing 50% NaOH and 50% water, was added. The reactants were completely in solution at 48° C. With agitation and circulation of the reactants continuing, 150 pounds of wet process, green superphosphoric acid, containing 68% $P_2O_5$, was rapidly pumped into the reaction mixture in 30 seconds, quickly decreasing pH of the reaction mixture to 2.8. The low pH started the exothermic urea formaldehyde reaction. After holding the temperature at 50° C. for 5 minutes by circulating cooling water in the reactor jacket, cooling was stopped and the heat released by the reaction was allowed to increase the temperature of the reaction mixture to 70° C. The pH was continuously monitored as temperature increased, and small additions of aqua ammonia were made to allow pH to increase about 0.1 unit per 2° C. temperature rise.

When the temperature reached 70° C., it was held there by circulating water through the external jacket of the reactor, and pH was maintained at 4.0 until the total reaction time reached 30 minutes.

Maximum cooling water was placed on reactor jacket, and 600 pounds of 85 Brix Cane Molasses, 60 pounds of technical grade methanol, and 247 pounds of water, were pumped into the circulating and agitated mixture at pH 4.0. As soon as the addition of these materials was completed, 43 pounds of aqua ammonia (containing 24% $NH_3$ and 76% $H_2O$) was pumped into the reaction mixture, increasing pH to 6.3.

While the reaction mixture continued to circulate and cool, 460 pounds of ammonium polyphosphate solution (10N-34$P_2O_5$-0$K_2O$) was pumped in, and 291 pounds of fine commercial soluble grade potash (potassium chloride, 62% $K_2O$) and 60 pounds of dry attapulgite clay was added by auger through an opening in the top of the reactor, with the total addition time required for the phosphate and potash amounting to 4 minutes and the circulating time used to gel the clay was 15 minutes additional.

The reaction product, a light tan colored, thin gel, was cooled to 30° C. and pumped to storage through a strainer, made of 100 mesh tyler screen. After two days storage at ambient temperature, the product was analyzed by methods in, "Official Methods of Analysis of Association of Official Agricultural Chemists," Tenth Edition, 1965, with results obtained as follow:

| Component | Wt % |
|---|---|
| Total Nitrogen (Method 2.044) | 12.1 |
| Water Insoluble Nitrogen (Method 2.057) | 8.3 |
| Free Urea | 0.0 |
| Total Phosphorous (as $P_2O_5$) | 4.2 |
| Polyphosphate (as $P_2O_5$) | 2.6 |
| Potash (as $K_2O$) | 3.0 |
| Water | 46.7 |
| Methyl Alcohol | 1.0 |
| Sugars (as Sucrose) | 4.8 |
| Attapulgite Clay | 1.0 |
| Urea/Formaldehyde, Mol Ratio | 1.45 |
| Viscosity, centipoises at 25° C | 150 |

The portion of nitrogen fed as urea was 92.7%, with the remaining ammonium nitrogen unavailable for conversion to water insoluble nitrogen. Conversion of all nitrogen to the water insoluble form was 66.9% and conversion of the urea nitrogen was 72.2%.

EXAMPLE 2

This example demonstrates preparation method for a fertilizer comprising substantially water insoluble nitrogen with essentially no ammoniacal or free urea nitrogen.

To a 8' diameter, 1200 gallon, jacketed stainless steel reactor equipped with a high shear centrifugal circulating pump and a 18" diameter turbine agitator with 6 flat blades, was added 3210 pounds of urea liquor containing 40% urea and 60% water, and 864 pounds of urea-formaldehyde concentrate, containing 25% urea, 60% formaldehyde, and 15% water. Agitation was started and 30 pounds of commercial caustic potash containing 45% KOH and 55% water, was added. Heating was started by circulating warm water through the reactor jacket as the solution became clear at 39° C. Wet process, green superphosphoric acid containing 68% $P_2O_5$, amounting to 180 pounds was rapidly pumped into the reaction mixture in 30 seconds, quickly decreasing pH to 2.6. Temperature increased quickly to 52° C. and was held there for 5 minutes, and then allowed to gradually increase from the exothermic heat of reaction to 70° C. As the temperature increased from 52° to 70° C., small amounts of ammonia were reacted to increase pH by about 0.1 unit per 2° C. temperature increase. Temperature reached 70° C. and pH reached 4.0, 15 minutes after increase above 52° C. started. Temperature was then controlled at 70° C. for an additional 15 minutes at pH by circulating water through the external jacket of the reactor.

Maximum cooling was placed on the reactor jacket, then 100 pounds of technical grade isobutyl alcohol was added. Immediately thereafer, 70 pounds of commercial caustic potash (45% KOH) was pumped into the reaction mixture increasing pH to 6.5.

While the reaction mixture continued to circulate and cool, 516 pounds of water containing 10% gelled attapulgite clay was added. The reaction product was cooled to 31° C. and pumped through a 100 mesh (Tyler) strainer to storage. After 3 days storage at ambient temperature, the product was analyzed with results as follow:

| Component | Wt % |
|---|---|
| Total Nitrogen (Method 2.044) | 13.7 |
| Water Insoluble Nitrogen (Method 2.057) | 10.2 |
| Free Urea | 0.0 |
| Total Phosphorous (as $P_2O_5$) | 2.4 |
| Potash (as $K_2O$) | 1.0 |
| Polyphosphate (as $P_2O_5$) | 1.2 |
| Water | 52.7 |
| Isobutyl Alcohol | 2.0 |
| Attapulgite Clay | 0.5 |
| Urea/Formaldehyde, Mol Ratio | 1.45 |
| Viscosity, centipoise at 25° C. | 180 |

Essentially all of the nitrogen was fed in the urea form. Total conversion of nitrogen to the water insoluble form was 74%.

EXAMPLE 3

This example demonstrates chemical stability and storability of liquid fertilizer made by the improved method of this invention.

Product of example 1 was stored in a closed 1000 gallon tank outdoors from June 1 to Jan 1 at ambient temperatures ranging from 98° F. to 11° F., and was sampled and analyzed after this 7 month storage period. The amount of settling which had occurred was minor with no compact solids on the bottom of the tank. There was 17% clear liquor on top of the gel. The mixture was brought to its original homogeneous state by the mild agitation created by circulating for 15 minutes with a pump having a 100 gallon per minute capacity.

Viscosity of the stored product was 160 centipoise. The product contained no free urea, and 8.4% water insoluble nitrogen. There were no heavy urea-formaldehyde polymers which were not readily suspended in the fertilizer gel. Pumping the complete product through a 100 mesh screen left no particles retained on the screen. The constant viscosity, and no large polymer particles indicate that no appreciable polymer growth occurred.

EXAMPLE 4

This example demonstrates the non-burning character and the outstanding performance of the liquid fertilizer prepared by the improved method in the foliar fertilization of field crops. Specific performance comparison was made of foliar fertilization of soybeans using the product of this invention and the most popular commercial foliar fertilizer for soybeans.

A large field of Essex soybeans in central Virginia, which had received normal fertilization, was divided into several 0.01 acre test plots and was treated on Aug. 26, 1976 by carefully hand-spraying the foliage with the product of example 1, and a clear liquid fertilizer analyzing 10% N, 2.3% $P_2O_5$, 3.6% $K_2O$, and 0.5% S, comprising urea, potassium polyphosphate, and potassium sulfate. The clear liquid fertilizers were applied at several different rates with and without water dilution. Some plots were treated for the second time on Sept. 10, 1976. Burning was evident on all plants treated with the clear liquid fertilizer with the degree depending upon the amount of fertilizer used. The product of this invention caused no discernible burn or foliage damage. The test plots were harvested on Oct. 21, 1976 and evaluated, with results as follow:

| Fertilizer | lbs/Acre Fertilizer | lbs Water/lb Fertilizer | Number of Treatments | Yield, Bushels/Acre |
|---|---|---|---|---|
| Check | 0 | 0 | 0 | 31.5 |
| Clear Liquid | 250 | 0 | 1 | 25.0 |
| Clear Liquid | 63 | 3 | 3 | 29.8 |
| Clear Liquid | 125 | 1 | 1 | 27.7 |
| Example 1 | 250 | 0 | 1 | 39.6 |

EXAMPLE 5

This example demonstrates the efficacy and non-burning properties of foliar fertilizer prepared by the method of this invention when applied to a field of peanuts, and compared to materials prepared by methods of the prior art.

A large field of Florigiant variety of peanuts grown with good soil practices in central Virgnia, was divided into several 0.01 acre test plots. These plots were treated with a high pressure atomizing hand-held sprayer. Each plot was sprayed one time as evenly as possible on the foliage at a rate of 150 pounds of fertilizer solution per acre with no dilution.

Fertilizer liquid prepared in example 2, fertilizer liquid containing urea-formaldehyde polymers prepared as in example 1 of U.S. Pat. No. 3,096,168, and fertilizer liquid containing urea-formaldehyde polymers prepared as in example 1 of U.S. Pat. No. 3,677,736 were used on three plots, and two test plots were given no foliar fertilization.

The foliage of the plots treated with fertilizers prepared according to U.S. Pat. Nos. 3,096,168 and 3,677,736 turned yellow, where the fertilizer hit, within four days and a large portion of the affected leaves appeared to be dead within two weeks of the treatment. There was no yellowing effect on the untreated plants nor on the plants treated with material prepared in example 2 of this invention. This material remained on the surface and was clearly visible as a white color on the foliage when the crop was harvested 6 weeks later.

The results of the tests are summarized in the following table:

| Plot No. Fertilizer | lbs/Acre | Yield, lbs Dry Peanuts/Acre |
|---|---|---|
| 1-Check | 0 | 3565 |
| 2-Example 2, this method | 150 | 4185 |
| 3-Example 1, U.S. Pat. 3,096,168 | 150 | 2860 |
| 4-Example 1, U.S. Pat. 3,677,736 | 150 | 3290 |
| 5-Check | 0 | 3610 |

I claim:

1. A stepwise method for preparation of a stable, non-burning urea-formaldehyde polymer-based, liquid foliar fertilizer, which comprises (1) dissolving urea and urea-formaldehyde concentrate in aqueous alkali solution at temperatures below 50° C., (2) adding polyphosphoric acid to rapidly reduce pH below 3, (3) maintaining temperature and pH constant for about 5 minutes, (4) allowing reaction temperature to gradually increase to about 70° C. while increasing pH of the mixture about 0.1 pH per 2° C. temperature rise, (5) cooling and adding minor amounts of water soluble aliphatic alcohols containing 1-4 molecular skeletal carbons, (6) neutralizing the reaction mixture with aqueous ammonia to pH 6.1-6.5, (7) blending with gelled attapulgite clay amounting to 0.5 to 2.0 percent of the fertilizer weight, and (8) removing any particles larger than 75 microns in diameter prior to storage or use.

2. A method for increasing yields of field crops by foliar treatment with a liquid suspension fertilizer as defined in claim 1.

* * * * *